(12) United States Patent
Itoh

(10) Patent No.: US 9,405,208 B2
(45) Date of Patent: Aug. 2, 2016

(54) IMAGE PROCESSING APPARATUS, IMAGE PROCESSING METHOD, AND COMPUTER PROGRAM PRODUCT

(71) Applicant: Takanori Itoh, Kanagawa (JP)

(72) Inventor: Takanori Itoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/714,638

(22) Filed: May 18, 2015

(65) Prior Publication Data

US 2015/0346622 A1 Dec. 3, 2015

(30) Foreign Application Priority Data

May 29, 2014 (JP) .................. 2014-111676

(51) Int. Cl.
*G03G 15/00* (2006.01)
*G03G 15/01* (2006.01)
*H04N 1/23* (2006.01)

(52) U.S. Cl.
CPC ............ *G03G 15/01* (2013.01); *G03G 15/6585* (2013.01); *H04N 1/23* (2013.01); *G03G 2215/0129* (2013.01)

(58) Field of Classification Search
CPC ............ G03G 15/065; G03G 15/6585; H04N 1/2307; H04N 1/233; H04N 1/2369
USPC .................. 399/39, 67; 358/1.9; 347/103, 104
See application file for complete search history.

(56) References Cited

U.S. PATENT DOCUMENTS

| 2010/0259770 | A1 | 10/2010 | Usuda et al. |
| 2012/0237244 | A1* | 9/2012 | Yoshikawa ......... G03G 15/6585 399/67 |
| 2014/0104336 | A1 | 4/2014 | Usuda et al. |

FOREIGN PATENT DOCUMENTS

| JP | 2007-083634 | 4/2007 |
| JP | 2012-212131 | 11/2012 |
| JP | 5439917 | 12/2013 |

\* cited by examiner

*Primary Examiner* — Walter L Lindsay, Jr.
*Assistant Examiner* — Jessica L Eley
(74) *Attorney, Agent, or Firm* — Cooper & Dunham LLP

(57) ABSTRACT

An image processing apparatus includes a receiving unit to receive color plane data and white control plane data for specifying a type of a white effect to be applied to a recording medium with a white color material; a determining unit to determine image recording operation for realizing the white effect based on the white control plane data; a first generating unit to generate chromatic color material image data indicating a recording amount of a chromatic color material based on the color plane data; a second generating unit to generate white color material image data indicating a recording amount of a white color material based on the white control plane data; and a control unit to control recording of images corresponding to the chromatic color material image data and the white color material image data on one or both sides of the recording medium according to the image recording operation.

6 Claims, 11 Drawing Sheets

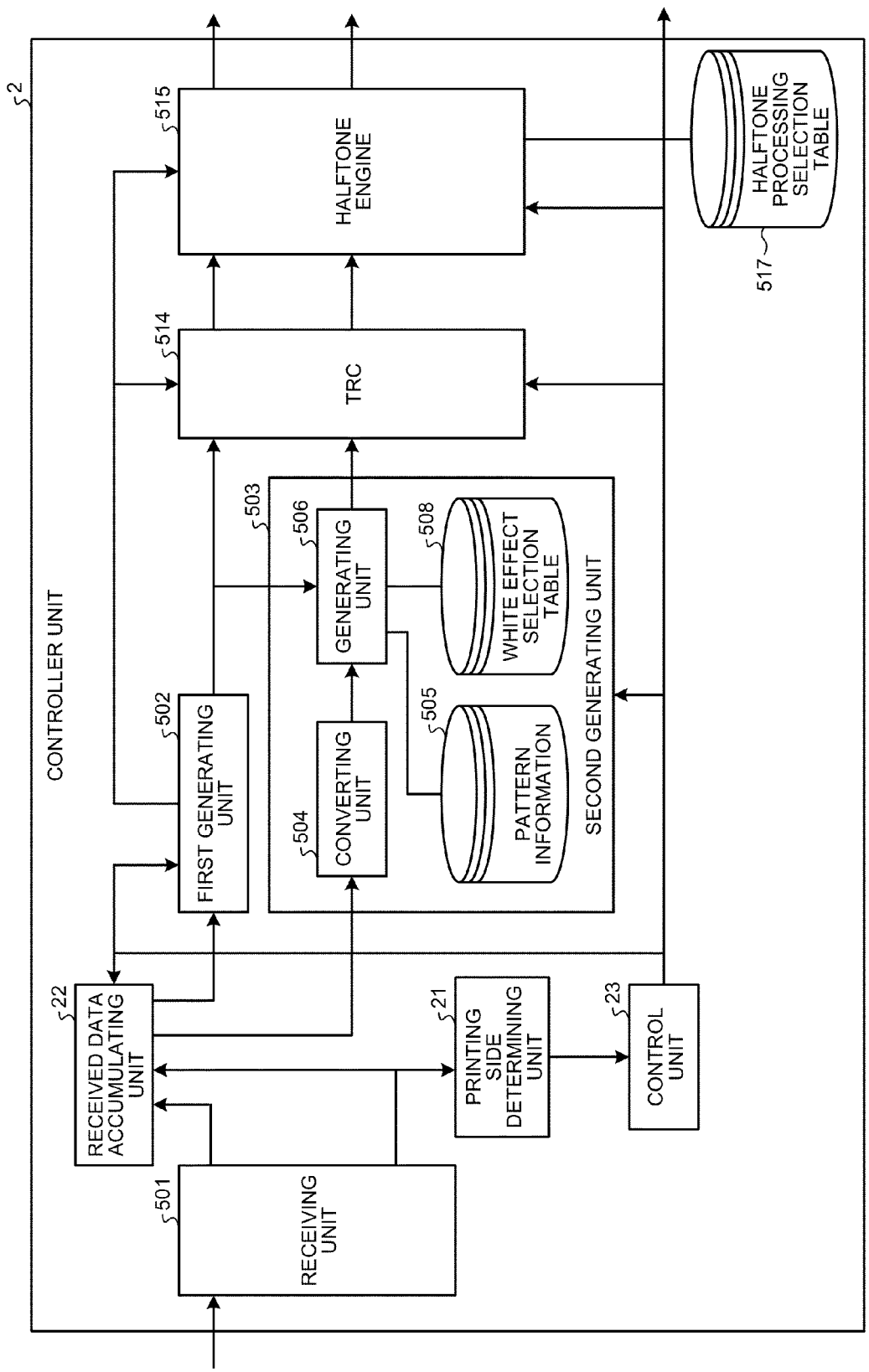

FIG.5

| DEN-SITY (%) | DENSITY VALUE | | EFFECT | MODE |
|---|---|---|---|---|
| | REPRE-SENTATIVE VALUE | VALUE RANGE | | |
| 98% | 250 | 248 | 255 | BACKING 1 | ENTIRE-SURFACE-OF-BACK-SIDE FILL |
| 96% | 245 | 243 | 247 | BACKING 2 | NON-WHITE-BACKGROUND-OF-BACK-SIDE FILL |
| 94% | 240 | 238 | 242 | RESERVED | |
| 50% | 127 | 125 | 129 | RESERVED | |
| 48% | 122 | 120 | 124 | DESIGN PATTERN 3 (CIRCLE) | FRONT SUPERIMPOSED TILED PATTERN |
| 46% | 117 | 115 | 119 | DESIGN PATTERN 2 (GRID) | FRONT SUPERIMPOSED TILED PATTERN |
| 44% | 112 | 110 | 114 | DESIGN PATTERN 1 (WAVE) | FRONT SUPERIMPOSED TILED PATTERN |
| 42% | 107 | 105 | 108 | RESERVED | |
| 40% | 102 | 100 | 104 | BACKGROUND CHARACTER 3 (SAMPLE) | NON-WHITE-BACKGROUND TILED CHARACTER STRING |
| 38% | 97 | 95 | 99 | BACKGROUND CHARACTER 2 (COPY PROHIBITED) | NON-WHITE-BACKGROUND TILED CHARACTER STRING |
| 36% | 92 | 90 | 94 | BACKGROUND CHARACTER 1 (SAMPLE) | NON-WHITE-BACKGROUND TILED CHARACTER STRING |
| 34% | 87 | 85 | 89 | RESERVED | |
| 32% | 82 | 80 | 84 | BACKGROUND PATTERN 3 (CIRCLE) | NON-WHITE-BACKGROUND TILED PATTERN |
| 30% | 76 | 74 | 79 | BACKGROUND PATTERN 2 (GRID) | NON-WHITE-BACKGROUND TILED PATTERN |
| 28% | 71 | 69 | 73 | BACKGROUND PATTERN 1 (WAVE) | NON-WHITE-BACKGROUND TILED PATTERN |
| 26% | 66 | 64 | 68 | RESERVED | |
| 2% | 5 | 1 | 7 | RESERVED | |
| 0% | 0 | 0 | 0 | NONE | |

FIG.10A 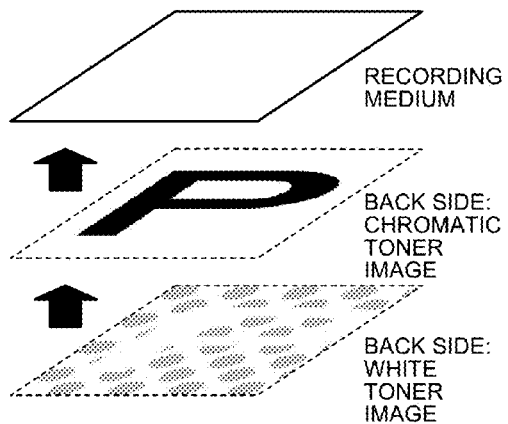

FIG.10B 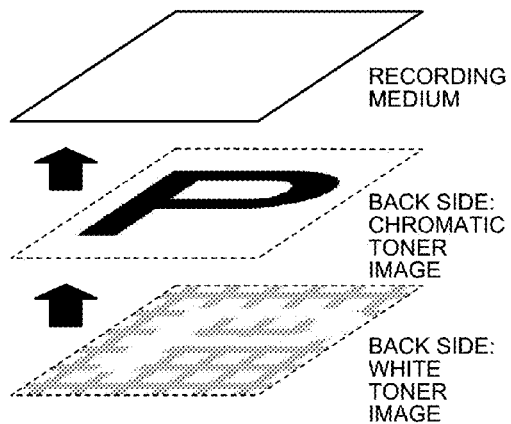

FIG.11

| OBJECT | | PHOTOGRAPH | CHARACTER | GRAPHICS |
|---|---|---|---|---|
| HALFTONE PROCESSING (NUMBER OF LINES, SHAPE, ANGLE) | C | 190-LINE HALFTONE DOT, 72° | 268-LINE HALFTONE DOT, 153° | 192-LINE HALFTONE DOT, 27° |
| | M | 190-LINE HALFTONE DOT, 18° | 268-LINE HALFTONE DOT, 63° | 192-LINE HALFTONE DOT, 117° |
| | Y | 200-LINE HALFTONE DOT, 0° | 268-LINE HALFTONE DOT, 8° | 192-LINE HALFTONE DOT, 63° |
| | K | 212-LINE HALFTONE DOT, 45° | 268-LINE HALFTONE DOT, 116° | 192-LINE HALFTONE DOT, 153° |
| | W | 171-LINE HALFTONE DOT, 0° | 282-LINE HALFTONE DOT, 45° | 200-LINE HALFTONE DOT, 90° |

IMAGE PROCESSING APPARATUS, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2014-111676 filed in Japan on May 29, 2014.

BACKGROUND OF THE INVENTION

1. Field of the Invention

The present invention relates to an image processing apparatus, an image processing method, and a computer program product.

2. Description of the Related Art

There is a known printer capable of recording an image with color materials (toner) of chromatic colors such as CMYK on a recording medium such as a paper, and capable of further recording an image with a fifth color material (toner) on the surface of the recorded image. Further, there is a known image processing apparatus including a printer controller or the like compatible with the above described printer. Examples of the fifth color material (toner) include a white color material (toner).

When the white color material is employed as the fifth color material, and if the white color material is recorded on the surface of an image recorded with the chromatic color materials, the image recorded with the chromatic color materials becomes invisible by being covered with the white color material. Therefore, there is a known technology for providing an operation mode to record an image with chromatic color materials on the front side of a recording medium and record the white color material on a part of the back side of the recording medium so as to correspond to the image on the front side (see, for example, Japanese Laid-open Patent Publication No. 2007-083634). This technology is based on the assumption that the recording medium is transparent, and uses the white color material to prevent the color image formed on the front side of the recording medium from being influenced from the back side.

However, in the conventional technology, the method of using the white color material is limited, and there is no system for using the white color material in various ways.

SUMMARY OF THE INVENTION

It is an object of the present invention to at least partially solve the problems in the conventional technology.

An image processing apparatus includes a data receiving unit, a determining unit, and a first generating unit, a second generating unit, and a control unit. The receiving unit receives color plane data as chromatic image data, and receives white control plane data as image data for specifying a type of a white effect indicating a visual or tactile effect to be applied to a recording medium by using a white color material. The determining unit determines image recording operation for realizing the white effect specified by the white control plane data, on the basis of the white control plane data. The first generating unit generates chromatic color material image data indicating a recording amount of a chromatic color material on the basis of the color plane data. The second generating unit generates white color material image data indicating a recording amount of a white color material on the basis of the white control plane data. The control unit to control recording of images corresponding to the chromatic color material image data and the white color material image data on one side or both sides of the recording medium in accordance with the image recording operation determined by the determining unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of a functional configuration of the controller unit;

FIG. 5 is a diagram illustrating an example of a white effect selection table;

FIGS. 10A and 10B are schematic diagrams illustrating other printing examples of the background design effect;

FIG. 11 is a diagram illustrating an example of a halftone processing selection table;

DETAILED DESCRIPTION OF THE PREFERRED EMBODIMENTS

Exemplary embodiments of an image processing apparatus, an image processing method, a computer program product, and a recording medium according to the present invention will be described in detail below with reference to the accompanying drawings.

Figure 1:
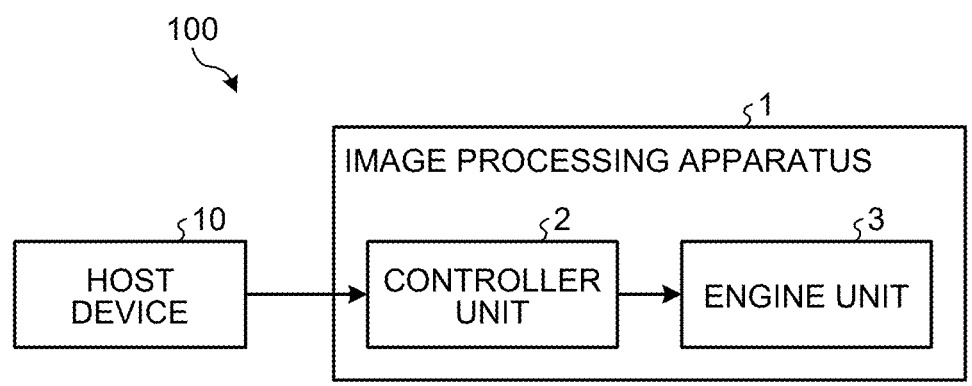
FIG. 1 is a diagram illustrating an example of a configuration of an image processing system.

FIG. 1 is a diagram illustrating an example of a configuration of an image processing system 100 of an embodiment. The image processing system 100 of the embodiment includes an image processing apparatus 1 and a host device 10. The image processing apparatus 1 and the host device 10 are communicably connected to each other with or without wires. The host device 10 transmits image data to the image processing apparatus 1. The image processing apparatus 1 includes a controller unit 2 and an engine unit 3. The controller unit 2 receives image data from the host device 10. The image data includes color plane data that is chromatic image data, and white control plane data that is image data for specifying a type of a white effect indicating a visual or tactile effect to be applied to a recording medium, such as a paper (transfer sheet), by using a white color material (in this example, white toner). The controller unit 2 performs image processing on the image data received from the host device 10 to generate color material image data, and transmits the color material image data to the engine unit 3. The color material image data is data indicating a recording amount of a color material for each pixel of an image to be printed. The color material image data includes chromatic color material image data and white color material image data. Details of the chromatic color material image data and the white color material image data will be described later. The engine unit 3 receives the color material image data from the controller unit 2, and records an image corresponding to the color material image data on a recording medium, such as a paper. The engine unit 3 corresponds to an "image recording unit" in the appended claims.

Figure 2:
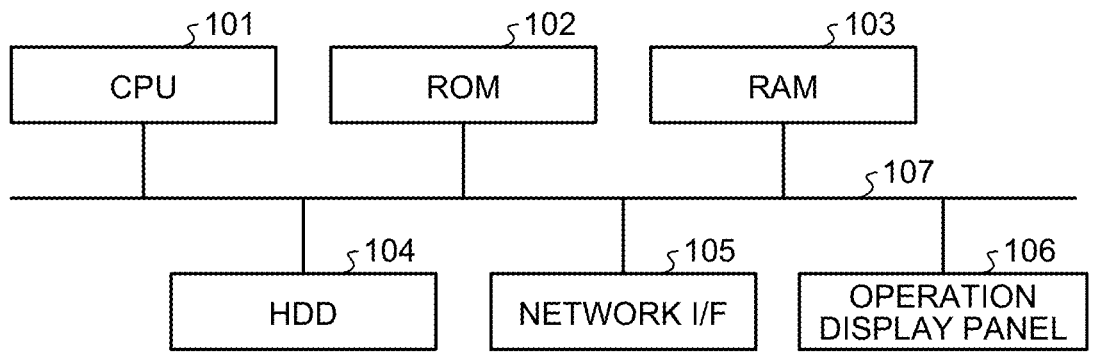
FIG. 2 is a diagram illustrating an example of a hardware configuration of a controller unit.

FIG. 2 is a diagram illustrating an example of a hardware configuration of the controller unit 2 of the image processing apparatus 1. The controller unit 2 includes a central processing unit (CPU) 101, a read only memory (ROM) 102, a random access memory (RAM) 103, a hard disk drive (HDD) 104, a network interface (I/F) 105, an operation display panel 106, and a bus 107. The CPU 101, the ROM 102, the RAM 103, the HDD 104, the network I/F 105, and the operation display panel 106 are connected to one another via the bus 107.

The CPU 101 executes a program. The ROM 102 stores therein a system boot program or the like. The system boot program is a program for activating a system program for controlling a system of the image processing apparatus 1. The RAM 103 is a memory used when the CPU 101 executes the program. The HDD 104 is an auxiliary storage device of the image processing apparatus 1. The HDD 104 stores therein an application program, such as an image processing program for processing an image by the image processing apparatus 1, the system program of the image processing apparatus 1, various kinds of data, and the like. The HDD 104 may be an optical drive, a flash memory, or the like. A recording medium on which read and write is performed by an optical drive is, for example a compact disk read only memory (CD-ROM), a compact disk recordable (CD-R), a digital versatile disk (DVD), or the like. The network I/F 105 transmits and receives various kinds of information to and from an external apparatus, such as the host device 10. The operation display panel 106 receives an operation input from a user.

Incidentally, the program stored in the ROM 102 may be provided by being recorded in a computer-readable recording medium, such as a CD-ROM, a CD-R, or a DVD, in a computer-installable or computer-executable file.

Figure 3:
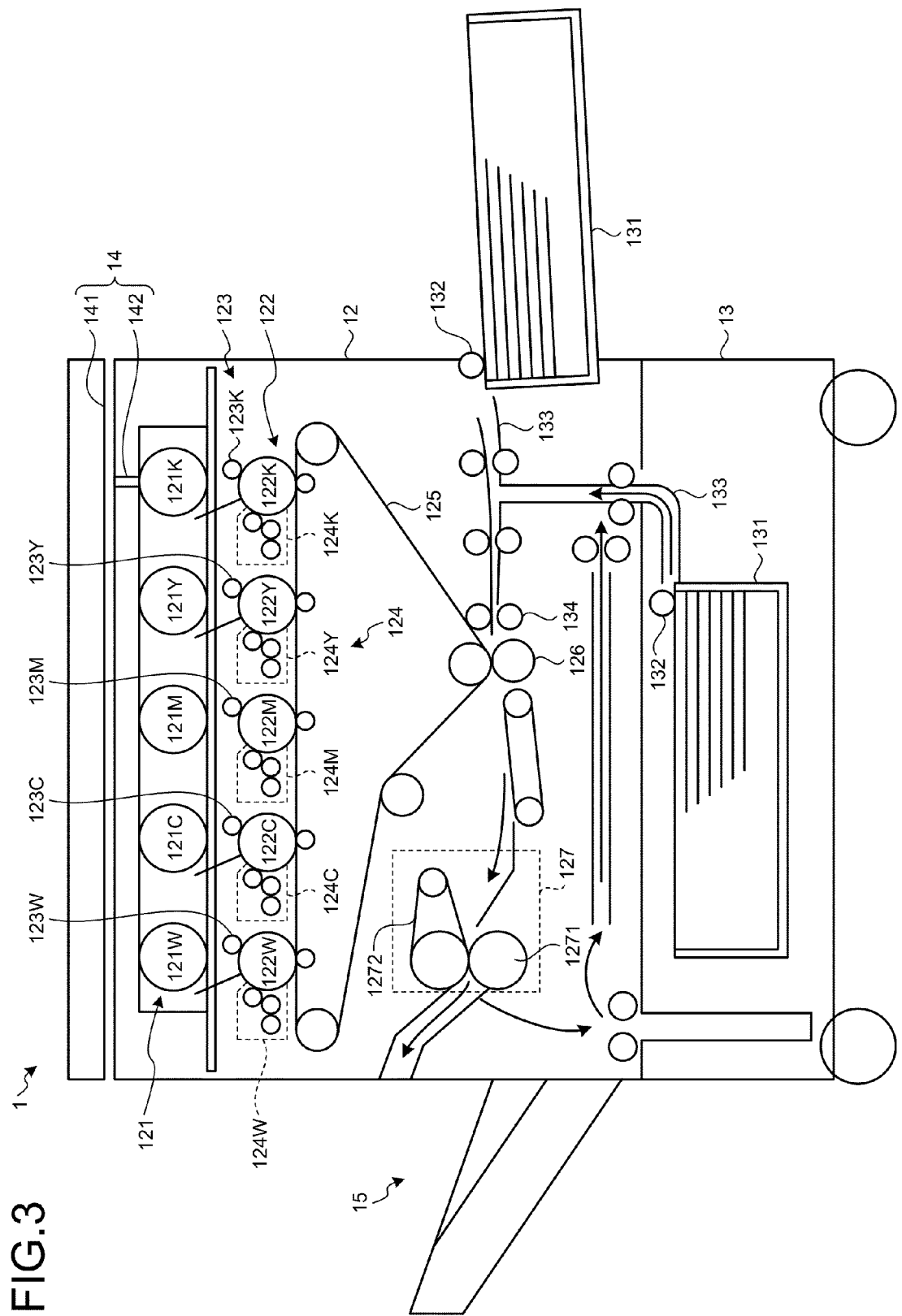
FIG. 3 is a diagram illustrating an example of a hardware configuration of an engine unit.

FIG. 3 is a diagram illustrating an example of a hardware configuration of the engine unit 3 of the image processing apparatus 1. The engine unit 3 of the embodiment includes a printer unit 12, a paper feeding unit 13, a scanner unit 14, and a paper ejection unit 15.

The printer unit 12 includes a cartridge 121, a photoconductor drum 122, a charging unit 123, a developing unit 124, an intermediate transfer belt 125, a secondary transfer roller 126, and a fixing unit 127. The fixing unit 127 includes a pressing roller 1271 and a fixing belt 1272.

The cartridge 121 includes five cartridges 121C, 121M, 121Y, 121K, and 121W. The four cartridges 121C, 121M, 121Y, and 121K store therein chromatic color materials. The chromatic color material is, for example, chromatic toner. The cartridge 121C stores therein a color material of cyan (C) color. The cartridge 121M stores therein a color material of magenta (M) color. The cartridge 121Y stores therein a color material of yellow (Y) color. The cartridge 121K stores therein a color material of black (K) color. The cartridge 121W stores therein a color material of white (W) color. The white color material of the embodiment is a color material made from resin containing white colorant, such as $SiO_2$. The white color material is, for example, white toner. Hereinafter, an arbitrary cartridge among the cartridges 121C, 121M, 121Y, 121K, and 121W is referred to as the "cartridge 121".

The photoconductor drum 122 includes five photoconductor drums 122C, 122M, 122Y, 122K, and 122W corresponding to different types of color materials of the C color, the M color, the Y color, the K color, and the W color. Hereinafter, an arbitrary photoconductor drum among the photoconductor drums 122C, 122M, 122Y, 122K, and 122W is referred to as the "photoconductor drum 122". The photoconductor drum 122 is uniformly charged by the charging unit 123 (to be described later), and an electrostatic latent image corresponding to the color material image data received from the controller unit 2 is formed on the surface of the photoconductor drum 122. The developing unit 124 (to be described later) attaches the color material to the electrostatic latent image formed on the surface of the photoconductor drum 122, so that an image is formed.

The charging unit 123 includes five charging units 123C, 123M, 123Y, 123K, and 123W corresponding to different types of color materials of the C color, the M color, the Y color, the K color, and the W color. Hereinafter, an arbitrary charging unit among the charging units 123C, 123M, 123Y, 123K, and 123W is referred to as the "charging unit 123". The charging unit 123 is applied with a voltage and charges the surface of the photoconductor drum 122.

The developing unit 124 includes five developing units 124C, 124M, 124Y, 124K, and 124W corresponding to different types of color materials of the C color, the M color, the Y color, the K color, and the W color. Hereinafter, an arbitrary developing unit among the developing units 124C, 124M, 124Y, 124K, and 124W is referred to as the "developing unit 124". The developing unit 124 attaches the color material in the cartridge 121 to the photoconductor drum 122 charged by the charging unit 123, so that an image is formed on each of the photoconductor drums 122.

The intermediate transfer belt 125 is conveyed while coming in contact with the photoconductor drum 122. Therefore, the image formed on the photoconductor drum 122 is transferred to the intermediate transfer belt 125.

The secondary transfer roller 126 nips a recording medium conveyed from the paper feeding unit 13 (to be described later) between itself and the intermediate transfer belt 125 to thereby transfer the image formed on the intermediate transfer belt 125 to the recording medium and convey the recording medium on which the image is formed to the fixing unit 127.

The fixing unit 127 includes the pressing roller 1271 and the fixing belt 1272. The fixing unit 127 fixes the image to the recording medium conveyed by the secondary transfer roller 126. The pressing roller 1271 presses the recording medium against the fixing belt 1272 and applies heat to attach the color materials to the recording medium to thereby fix the image. The fixing belt 1272 presses the recording medium in a nip between itself and the pressing roller 1271 to thereby fix the image to the recording medium.

Next, a hardware configuration of the paper feeding unit 13 will be described. The paper feeding unit 13 includes a paper feeding tray 131, a paper feeding roller 132, a paper feeding belt 133, and a registration roller 134. The paper feeding unit 13 feeds a recording medium, such as a sheet, to the printer unit 12.

The paper feeding tray 131 stores therein recording media, such as sheets. The paper feeding roller 132 picks up a sheet of paper stored in the paper feeding tray 131 and places the sheet on the paper feeding belt 133. The paper feeding belt 133 conveys the sheet and inserts the sheet to a nip formed by the registration roller 134. The registration roller 134 conveys the sheet to a nip between the intermediate transfer belt 125 and the secondary transfer roller 126.

The paper feeding unit 13 includes, although detailed illustrations are omitted in the drawings, a switching unit, a paper ejection unit, a reversing unit, and a paper re-feeding tray. The switching unit switches a destination and conveys the recording medium, on which the image is fixed by the fixing unit 127, to the paper ejection unit 15 or the reversing unit. The paper ejection unit 15 ejects and stores the recording medium. The reversing unit switches the recording medium back to interchange the leading edge and the trailing edge. The paper re-feeding tray temporarily stores therein the recording medium whose leading edge and the trailing edge are interchanged. The paper feeding unit 13 further includes a paper feeding roller for picking up a recording medium stored in the paper re-feeding tray and placing the recording medium on the paper feeding belt 133, similarly to the paper feeding roller 132.

The scanner unit 14 includes a contact glass 141 and a reading sensor 142. The scanner unit 14 reads image information described on a sheet or the like. A sheet on which an image is described is placed on the contact glass 141. The reading sensor 142 reads the image information from the image described on the sheet placed on the contact glass 141.

Next, a configuration of the controller unit 2 will be described. FIG. 4 is a diagram illustrating an example of a functional configuration of the controller unit 2 of the embodiment. The controller unit 2 of the embodiment includes a receiving unit 501, a print side determining unit 21, a received data accumulating unit 22, a control unit 23, a first generating unit 502, a second generating unit 503, a TRC 514, and a halftone engine 515. Further, the controller unit 2 stores pattern information 505, a white effect selection table 508, and a halftone processing selection table 517 in a storage unit (not illustrated).

The receiving unit 501 receives print data containing at least image data and a job command from the host device 10. In the embodiment, the print data received by the controller unit 2 contains at least color plane data, and when a white effect is to be applied to an image, further contains white control plane data.

As described above, the color plane data is chromatic image data, in which a density value of a chromatic color, such as RGB, is defined for each pixel. In the color plane data, the density value of a chromatic color of a single pixel is represented by 8 bits for each basic color in accordance with a color designated by a user. For example, if the density value of a chromatic color of a single pixel is represented by using RGB, R is represented by 8 bits, G is represented by 8 bits, and B is represented by 8 bits. In this example, the color plane data is image data in the vector format.

Further, as described above, the white control plane data is image data for specifying a type of a white effect indicating a visual or tactile effect to be applied to a recording medium, such as a paper, by using a white color material (in this example, white toner). The white control plane data is represented by a density value of 8 bits in a range of "0" to "255" for each pixel similarly to the color plane data, and a type of the white effect is associated with the density value (the density value may be represented by 16 bits, 32 bits, or 0% to 100%). In this example, the white control plane data is image data in the vector format. A correspondence relationship between the density value set in the white control plane data and a type of a white effect will be described later.

Further, the same value is set in an area to which the same white effect is to be applied, regardless of the density of white toner to be actually attached. Therefore, even without data indicating the area, it is possible to easily specify a region, to which the white effect is to be applied, from the white control plane data if needed. Namely, the white control plane data represents a type of a white effect and a region to which the white effect is to be applied (it may be possible to separately add data indicating the region).

The receiving unit 501 sends the color plane data to the received data accumulating unit 22. Further, when print data contains the white control plane data, the receiving unit 501 sends the white control plane data to the received data accumulating unit 22 and the print side determining unit 21. Hereinafter, it is assumed that the print data contains the white control plane data. Furthermore, in this example, the receiving unit 501 may be considered that it has a function to receive the color plane data and the white control plane data, and corresponds to a "data receiving unit" in the appended claims.

The print side determining unit 21 determines image recording operation (operation of recording (forming) an image on a recording medium) for realizing a white effect specified by the white control plane data, on the basis of the white control plane data. More specifically, the print side determining unit 21 determines the image recording operation for realizing a white effect specified by the received white control plane data, on the basis of the white effect selection table 508 (to be described later). In the embodiment, the print side determining unit 21 analyzes a language of the white control plane data, determines whether only normal printing, that is, front-side printing, is needed, back-side printing is also needed, or only back-side printing is needed for each printing page, and sends a result of the determination to the control unit 23. In this example, the print side determining unit 21 corresponds to a "determining unit" in the appended claims.

Further, the received data accumulating unit 22 temporarily accumulates the color plane data and the white control plane data until the print side determining unit 21 completes the determination. In this example, the received data accumulating unit 22 corresponds to an "accumulating unit" in the appended claims. For example, the received data accumulating unit 22 may send the accumulated color plane data to the first generating unit 502 (to be described later) or send the accumulated white control plane data to the second generating unit 503 (to be described later) under control of the control unit 23 (to be described later).

The control unit 23 controls recording of images corresponding to the chromatic color material image data generated by the first generating unit 502 (to be described later) and the white color material image data generated by the second generating unit 503 (to be described later) on one side or both sides of a recording medium in accordance with the determination by the print side determining unit (in accordance with the image recording operation determined by the print side determining unit 21). More specifically, the control unit 23 controls the received data accumulating unit 22, the first generating unit 502, the second generating unit 503, and the engine unit 3 in accordance with the determination by the print side determining unit 21. In this example, the control unit 23 corresponds to a "control unit" in the appended claims.

The first generating unit 502 generates the chromatic color material image data (hereinafter, referred to as "chromatic toner image data") indicating a recording amount of a chromatic color material (in this example, chromatic toner) on the basis of the color plane data. In this example, the first generating unit 502 analyzes a language of the color plane data, converts image data expressed in the vector format to image data in the raster format, and converts a color space expressed in an RGB format or the like to a color space in a CMYK format, to thereby generate the chromatic toner image data. The chromatic toner image data is data indicating the recording amount of the chromatic toner for each pixel of an image. In the embodiment, the first generating unit 502 outputs the chromatic toner image data, in which the density value of each pixel is represented by 8 bits, for each of the CMYK colors, and sends the chromatic toner image data to the second generating unit 503 and the TRC 514. Further, the first generating unit 502 outputs object information, which contains information indicating a type of an object, such as a character, a photograph, or a graphic, and which contains the coordinates of the object for each image area extracted through the language analysis, and sends the object information to the TRC 514 and the halftone engine 515. In this example, the first generating unit 502 corresponds to a "first generating unit" in the appended claims.

The second generating unit 503 generates the white color material image data (hereinafter, referred to as "white toner image data") indicating a recording amount of a white color material (in this example, white toner) on the basis of the white control plane data. In this example, as illustrated in FIG. 4, the second generating unit 503 includes a converting unit 504 and a generating unit 506. The converting unit 504 analyzes a language of the white control plane data and coverts the vector format to the raster format. The converting unit 504 sends the white control plane data in the raster format to the generating unit 506. The generating unit 506 receives the white control plane data in the raster format from the converting unit 504, and receives the chromatic toner image data in the raster format from the first generating unit 502.

The generating unit 506 generates the white toner image data by using the white control plane data and the chromatic toner image data with reference to the pattern information 505 and the white effect selection table 508. The white toner image data is data indicating a recording amount of white toner of each pixel of an image.

The pattern information 505 is image data on a pattern, such as a design, a character string, or a background design. The generating unit 506 refers to the pattern information 505 when generating the white toner image data containing the pattern.

FIG. 5 is a diagram illustrating an example of the white effect selection table 508 of the embodiment. The white effect selection table 508 is information in a table format, in which a density value set in the white control plane data, a type of a white effect, and a mode representing a method of attaching the white toner to realize the white effect are associated with one another; however, the format is not limited to the table format and may be an arbitrary format. In this example, the white effect selection table 508 corresponds to "white effect selection information" in the appended claims. In the example illustrated in FIG. 5, the white effect selection table 508 contains fields of a density (%), a density value (a representative value and a value range), an effect, and a mode.

The density (%) is information for selecting a white effect (from a different point of view, information for specifying a white effect set in the white color plane data). In the example in FIG. 5, the density (%) is listed at intervals of 2%. The density value (the representative value and the value range) is information representing the density (%) by values in the range of 0 to 255. The value range is a range of density values corresponding to the density at intervals of 2%. The representative value is a value as a representative of the density values in the value range. The effect is information representing a type of a white color surface effect associated with the density (%) at each interval.

The mode is information indicating a mode on how to attach the white toner in order to realize an effect.

In the white effect selection table 508, a white effect is associated with the density (%) at each interval. Specifically, a backing effect is associated with a range of density values ("243" to "255") corresponding to the densities of equal to or greater than 96%. A design pattern effect is associated with a range of density values ("110" to "124") corresponding to the densities of 44% to 48%. A background character effect is associated with a range of density values ("90" to "104") corresponding to the densities of 36% to 40%. A background design effect is associated with a range of density values ("69" to "84") corresponding to the densities of 28% to 32%.

Figure 6A:
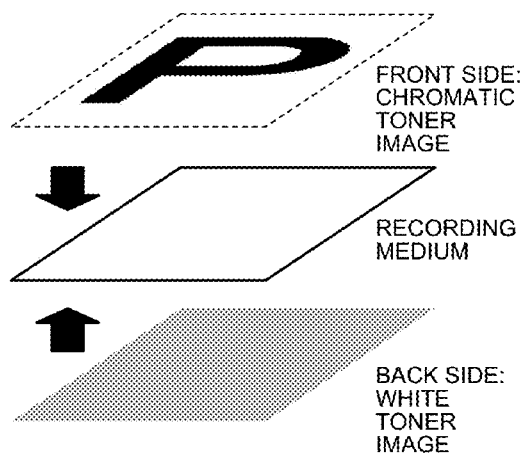
FIGS. 6A and 6B are schematic diagrams illustrating printing examples of a backing effect.
Figure 6B:
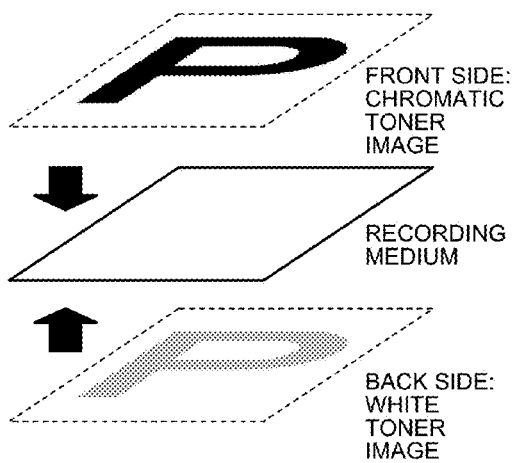

FIGS. 6A and 6B are schematic diagrams illustrating printing examples of the backing effect. In the embodiment, a white effect indicating a "backing 1" is associated with the density values of "248" to "255" (pixel values of the white control plane data) (see FIG. 5). As illustrated in FIG. 6A, the white effect indicating the "backing 1" is associated with a mode indicating solid printing of white toner on the entire surface of the back side of a recording medium (entire-surface-of-back-side fill) (also see FIG. 5).

Further, in the embodiment, a white effect indicating a "backing 2" is associated with the density values of "243" to "247" (see FIG. 5). As illustrated in FIG. 6B, the white effect indicating the "backing 2" is associated with a mode indicating solid printing of white toner on a region of the back side of a recording medium (non-white-background-of-back-side fill) corresponding to a non-white background of the recording medium, that is, corresponding to a region other than a white background (C=M=Y=K=0) of a chromatic toner image (an image developed with chromatic toner based on the above described chromatic toner image data) (also see FIG. 5).

Figure 7A:
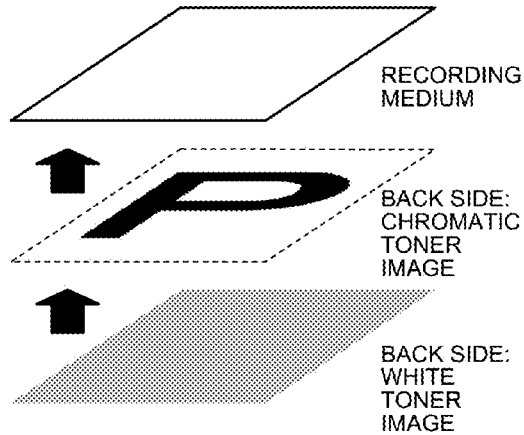
FIGS. 7A and 7B are schematic diagrams illustrating other printing examples of the backing effect.
Figure 7B:
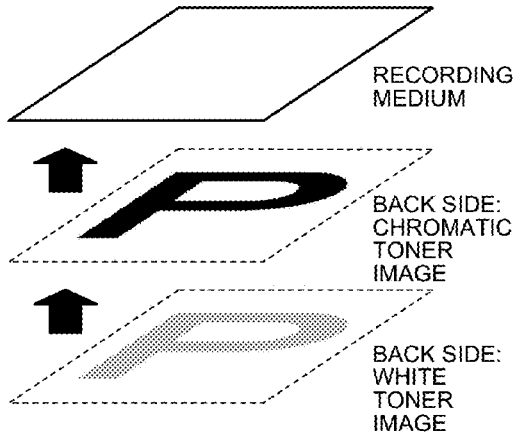

The backing effect is normally realized by, as illustrated in FIGS. 6A and 6B, printing a chromatic toner image on the front side of a recording medium and printing a white toner image (an image developed with white toner based on the above described white toner image data) on the back side of the recording medium. However, the backing effect is effective in a transparent recording medium; therefore, as illustrated in FIGS. 7A and 7B, it is possible to realize the backing effect by printing a chromatic toner image as well as the white toner image on the back side of a recording medium.

For example, the print side determining unit 21 may determine image recording operation for realizing a white effect specified by the received white control plane data, on the basis of the white effect selection table 508 and a type of a recording medium used for the image recording operation (a type of a recording medium to be actually used). For example, if a white effect corresponding to a density value set for a drawing object contained in the received white control plane data is a "backing effect" and a recording medium used for the image recording operation is a transparent recording medium, the print side determining unit 21 may determine image recording operation for printing a chromatic toner image of the drawing object on the back side of the recording medium and further printing, on the chromatic toner image, a white toner image in the mode associated with the "backing effect" in the white effect selection table 508 (in this case, only back-side printing is needed). For another example, if a white effect corresponding to a density value set for a drawing object contained in the received white control plane data is a "backing effect" and a recording medium used for the image recording operation is not a transparent recording medium, the print side determining unit 21 may determine image recording operation for printing a chromatic toner image of the drawing object on the front side of the recording medium and printing a white toner image on the back side of the recording medium in the mode associated with the "backing effect" in the white effect selection table 508 (in this case, duplex printing is needed). Incidentally, the print side determining unit 21 may ask for the engine unit 3 for example to provide a type of a recording medium to be actually used.

Figure 8A:
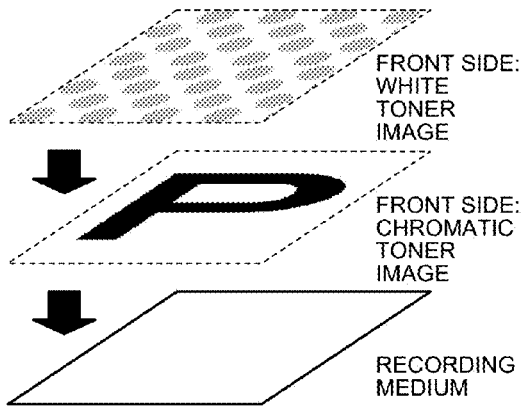
FIGS. 8A and 8B are schematic diagrams illustrating printing examples of a design effect.
Figure 8B:
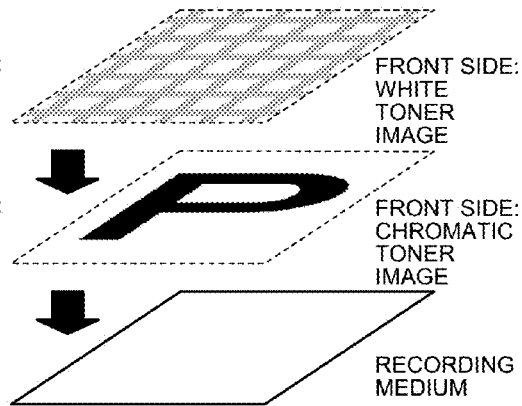

FIGS. 8A and 8B are schematic diagrams illustrating printing examples of a design pattern effect. In the embodiment, a white effect indicating a "design pattern 1" is associated with the density values of "110" to "114" (see FIG. 5). In this example, the design pattern 1 is a wavy design pattern. Further, in the embodiment, a white effect indicating a "design pattern 2" is associated with the density values of "115" to "119" (see FIG. 5). In this example, the design pattern 2 is a grid design pattern. Furthermore, in the embodiment, a white effect indicating a "design pattern 3" is associated with the density values of "120" to "124" (see FIG. 5). In this example, the design pattern 3 is a circular design pattern.

In the embodiment, as illustrated in FIG. 8A, the white effect indicating the "design pattern 3" representing the circular design pattern is associated with a mode indicating that a white toner image representing the circular design pattern is printed in an overlapping manner on a chromatic toner image printed on the front side of the recording medium. Further, as illustrated in FIG. 8B, the white effect indicating the "design pattern 2" representing the grid design pattern is associated with a mode indicating that a white toner image representing the grid design pattern is printed in an overlapping manner on a chromatic toner image printed on the front side of the recording medium.

Figure 9A:
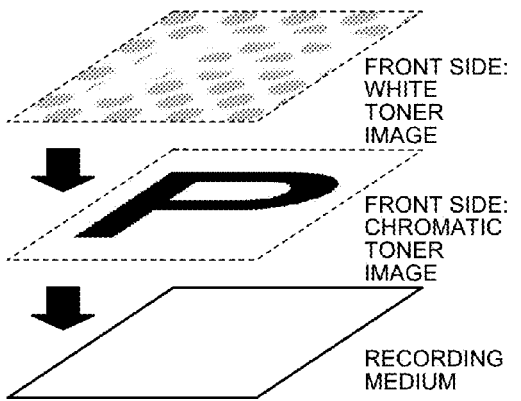
FIGS. 9A and 9B are schematic diagrams illustrating printing examples of a background design effect.
Figure 9B:
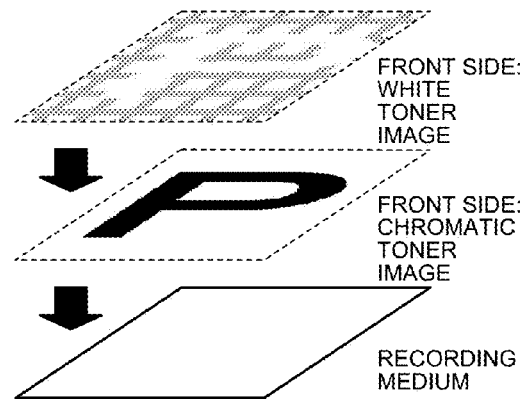

FIGS. 9A and 9B are schematic diagrams illustrating printing examples of the background design effect. In the embodiment, a white effect indicating a "background pattern 1" is associated with the density values of "69" to "73" (see FIG. 5). In this example, the background pattern 1 is a wavy background pattern. Further, in the embodiment, a white effect indicating a "background pattern 2" is associated with the density values of "74" to "79" (see FIG. 5). In this example, the background pattern 2 is a grid background pattern. Furthermore, in the embodiment, a white effect indicating a "background pattern 3" is associated with the density values of "80" to "84" (see FIG. 5). In this example, the background pattern 3 is a circular background pattern.

In the embodiment, as illustrated in FIG. 9A, the white effect indicating the "background pattern 3" representing the circular background pattern is associated with a mode indicating that a white toner image representing the circular background pattern is printed on a region of a white background (C=M=Y=K=0) on the front side of the recording medium. In this example, the white toner image is not printed on the non-white background, that is, a region other than the white background of the chromatic toner image; therefore, the chromatic toner image and the white toner image do not overlap each other. Further, in the embodiment, as illustrated in FIG. 9B, the white effect indicating the "background pattern 2" representing the grid background pattern is associated with a mode indicating that a white toner image representing the grid background pattern is printed on a region of a white background (C=M=Y=K=0) on the front side of the recording medium.

Furthermore, in the white effect selection table in FIG. 5, a white effect indicating a "background character 1" is associated with the density values of "90" to "94", a white effect indicating a "background character 2" is associated with the density values of "95" to "99", and a white effect indicating a "background character 3" is associated with the density values of "100" to "104". A white effect with the background character is the same as the white effect with the background pattern (the background patterns 1 to 3) as described above if the background pattern is replaced with a character string, and therefore, print examples thereof will be omitted.

Incidentally, as illustrated in FIGS. 9A and 9B, the background design effect is normally realized by printing the chromatic toner image and the white toner image on the front side of the recording medium. However, in the background design effect, the chromatic toner image and the white toner image do not overlap each other; therefore, if a transparent recording medium is used, as illustrated in FIGS. 10A and 10B, it may be possible to realize the background design effect by printing the chromatic toner image and the white toner image on the back side of the recording medium.

Explanation of FIG. 4 will be continued. The generating unit 506 generates white toner image data (for example, a pattern image, a solid image, or the like) for attaching a white toner, in accordance with the white effect and the mode corresponding to the density value of each pixel of the white control plane data by referring to the white effect selection table illustrated in FIG. 5. The generating unit 506 generates the white toner image data by referring to the chromatic toner image data if needed. Further, the generating unit 506 sends the generated white toner image data to the TRC 514.

The TRC 514 receives the object information from the first generating unit 502, receives the chromatic toner image data of each of the CMYK colors from the first generating unit 502, and receives the white toner image data from the second generating unit 503. The TRC 514 performs gamma correction, with use of a gamma curve of a 1D-LUT generated through calibration, on the chromatic toner image data and the white toner image data in accordance with the type of the object indicated by the object information. The TRC 514 sends the chromatic toner image data of each of the CMYK colors subjected to the gamma correction and the white toner image data subjected to the gamma correction to the halftone engine 515.

The halftone engine 515 receives the chromatic toner image data of each of the CMYK colors subjected to the gamma correction and the white toner image data subjected to the gamma correction from the TRC 514, and receives the object information from the first generating unit 502. Further, the halftone engine 515 reads the halftone processing selection table from a storage unit (not illustrated).

FIG. 11 is a diagram illustrating an example of the halftone processing selection table of the embodiment. The halftone processing selection table is a table, in which parameters (the number of lines, a shape, and an angle) for performing halftone processing are defined for each object and each type of toner. For example, if a type of an object is a photograph and a type of toner is a cyan (C) color, the halftone engine 515 performs halftone processing by setting the number of lines to 190, a shape to a halftone-dot pattern, and an angle to 72 degrees. The halftone processing is processing for conversion to a data format in which a pixel value of each pixel of a region of the object is represented by 2 bits, in accordance with the type of the object contained in an image. Meanwhile, the 2 bits are described by way of example, and other bits may be used.

The halftone engine 515 determines parameters (the number of lines, a shape, and an angle) used for halftone processing from the halftone processing selection table by using the type of the object indicated by the object information and a type of toner of toner image data. More specifically, the halftone engine 515 acquires attribute information indicating a type of an object for each pixel from the object information. Subsequently, the halftone engine 515 acquires a type of toner of a pixel of the toner image data corresponding to the attribute information of the pixel. Then, the halftone engine 515 determines parameters (the number of lines, a shape, and an angle) used for the halftone processing from the halftone processing selection table by using the attribute information indicating the type of the object for each pixel and the type of the toner of the pixel. The halftone engine 515 performs the halftone processing on the toner image data by using the parameters. The halftone engine 515 sends the toner image data (the chromatic toner image data of each of the CMYK colors and the white toner image data) subjected to the halftone processing to the engine unit 3.

Figure 12:
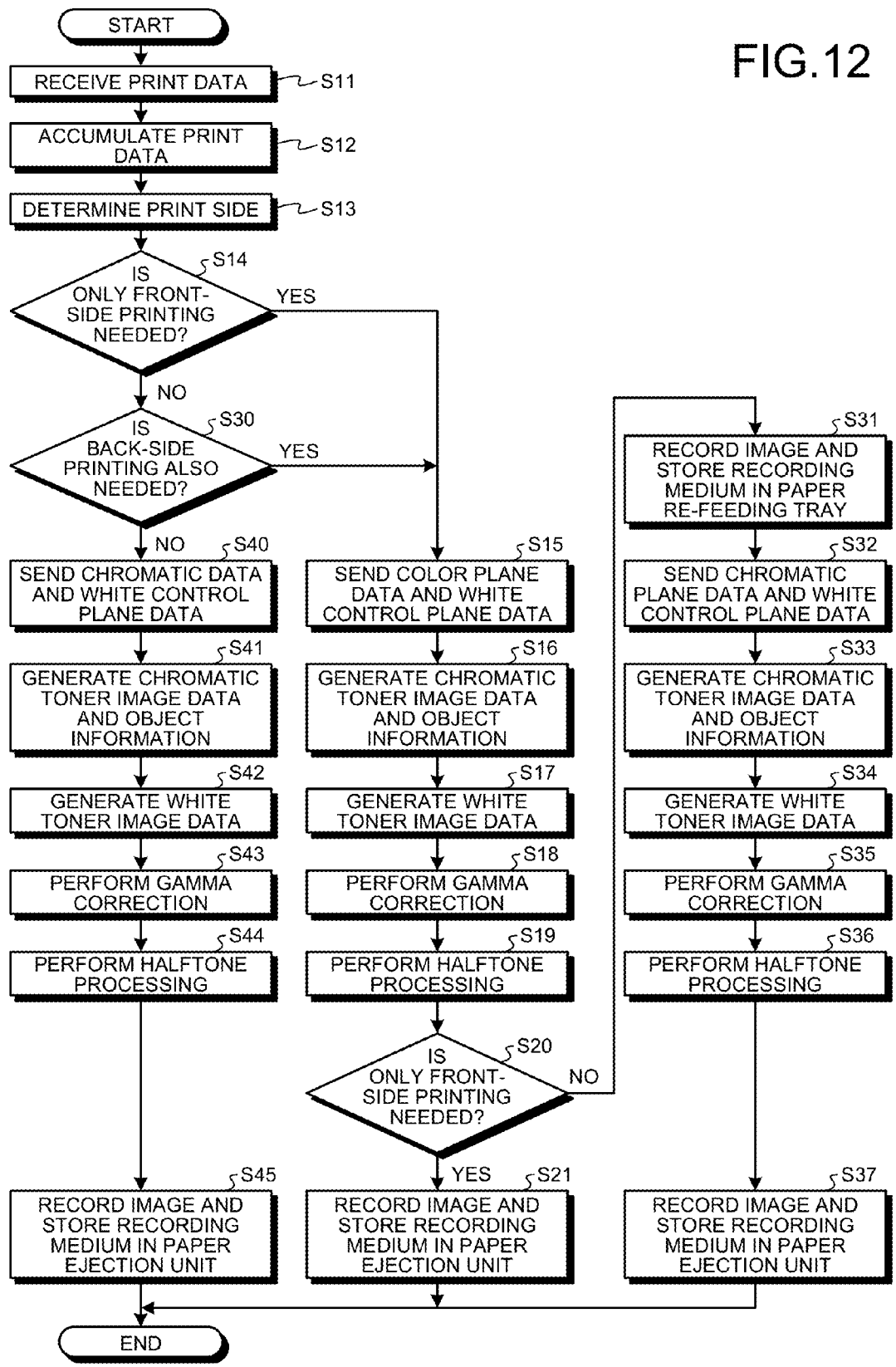
FIG. 12 is a flowchart illustrating an example of an image processing method of the embodiment.

FIG. 12 is a flowchart illustrating an example of an image processing method of the embodiment. The receiving unit 501 receives the above described print data from the host device 10 (Step S11). The receiving unit 501 sends color plane data of each of the CMYK colors contained in the print data to the received data accumulating unit 22. The receiving unit 501 sends the white control plane data contained in the print data to the print side determining unit 21 and the received data accumulating unit 22.

The received data accumulating unit 22 temporarily accumulates the color plane data and the white control plane data (Step S12). Further, the print side determining unit 21 analyzes a language of the white control plane data, and determines whether only normal printing, that is, front-side printing, is needed, back-side printing is also needed, or only back-side printing is needed for each printing page (Step S13). Details of the determination method will be described later. If the print side determining unit 21 determines that only normal printing is needed (YES at Step S14), the received data accumulating unit 22 sends the accumulated color plane data to the first generating unit 502. Further, the received data accumulating unit 22 sends the accumulated white control plane data to the second generating unit 503 (Step S15).

The first generating unit 502 analyzes a language of the color plane data, generates the above described chromatic toner image data, and generates the above described object information that is obtained through the language analysis (Step S16). The first generating unit 502 sends the chromatic toner image data to the generating unit 506 of the second generating unit 503 and the TRC 514, and sends the object information to the TRC 514 and the halftone engine 515.

The second generating unit 503 generates the above described white toner image data from the white control plane data (Step S17).

Figure 13:
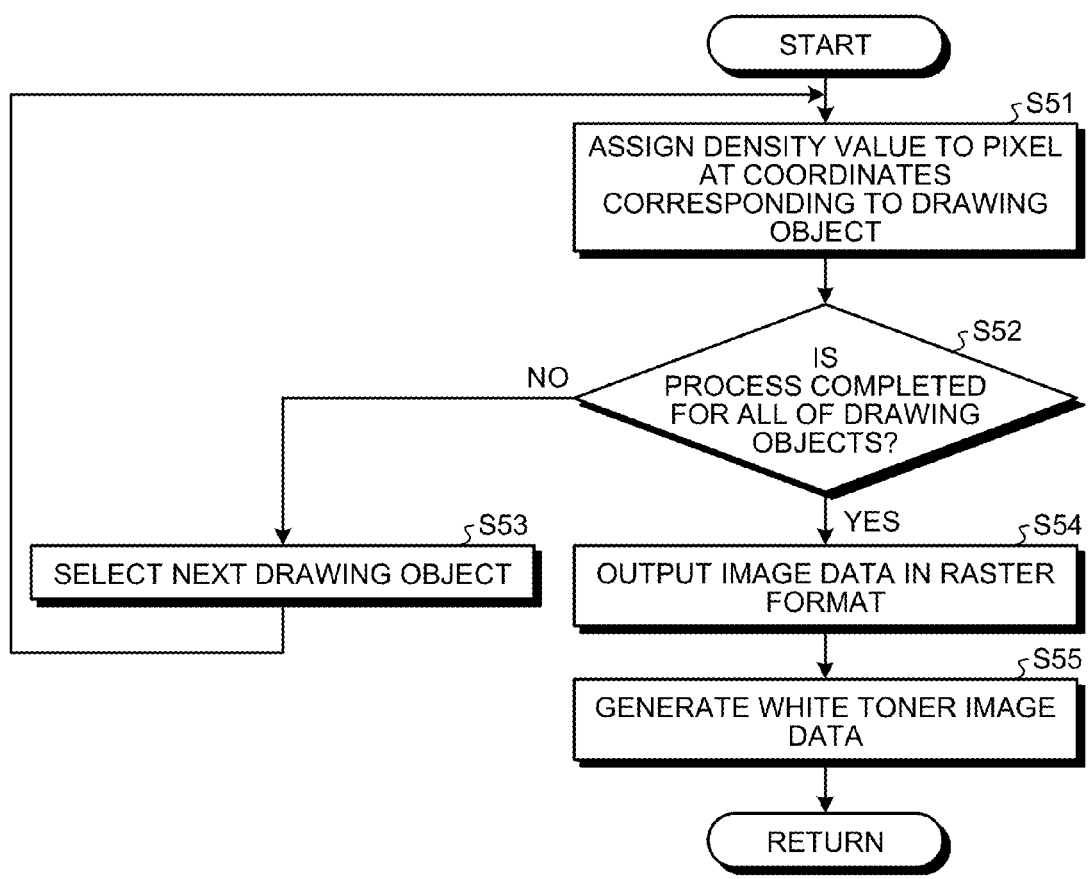
FIG. 13 is a flowchart illustrating an example of a method of generating white toner image data.

The process at Step S17 will be described in detail below. FIG. 13 is a flowchart illustrating an example of a method of generating the white toner image data of the embodiment. The second generating unit 503 (the converting unit 504) converts a data format of the white control plane data that associates density values with drawing objects to a data format represented by density values of pixels corresponding to the coordinates of the drawing objects (Step S51). Specifically, the second generating unit 503 (the converting unit 504) converts the data format of the white control plane data to the raster format.

The second generating unit 503 (the converting unit 504) determines whether the process at Step S51 is completed for all of the drawing objects (Step S52). If the process at Step S51 is not completed for all of the drawing objects (NO at Step S52), the second generating unit 503 selects a next drawing object (Step S53), and the process returns to Step S51. If the process at Step S51 is not completed for all of the drawing objects (YES at Step S52), the second generating unit 503 outputs the white control plane data in the raster format that is a data format in which a density value is associated with each of pixels (Step S54). The converting unit 504 sends the white color plane control data in the raster format to the generating unit 506. The generating unit 506 receives the white control plane data in the raster format, and receives the chromatic toner image data of each of the CMYK colors from the first generating unit 502. The generating unit 506 generates white toner image data from both of the white control plane data in the raster format and the chromatic toner image data of each of the CMYK colors by referring to the white effect selection table 508 and the pattern information 505 as described above (Step S55).

Explanation of FIG. 12 will be continued. The TRC 514 receives the object information from the first generating unit 502, receives the chromatic toner image data of each of the CMYK colors from the first generating unit 502, and receives the white toner image data from the second generating unit 503. The TRC 514 performs gamma correction, with use of a gamma curve of a 1D-LUT generated through calibration, on the chromatic toner image data and the white toner image data in accordance with the type of the object indicated by the object information (Step S18). The TRC 514 sends the chromatic toner image data of each of the CMYK colors subjected to the gamma correction and the white toner image data subjected to the gamma correction to the halftone engine 515.

The halftone engine 515 receives the chromatic toner image data of each of the CMYK colors subjected to the gamma correction and the white toner image data subjected to the gamma correction from the TRC 514, and receives the object information from the first generating unit 502. The halftone engine 515 determines parameters (the number of lines, a shape, and an angle) used for halftone processing from the above described halftone processing selection table by using the type of the object indicated by the object information and a type of toner of the toner image data. The halftone engine 515 performs the halftone processing on the toner image data by using the parameters, and sends the toner image data to the engine unit 3 (Step S19). Further, the engine unit 3 records an image corresponding to the received toner image data on the recording medium, and stores the recording medium in the above described paper ejection unit (YES at Step S20 or Step S21).

In contrast, if the print side determining unit 21 determines that back-side printing is also needed (NO at Step S14 or YES at Step S30), the processes from Step S15 to Step S19 are performed as described above, similarly to the case where the print side determining unit 21 determines that only front-side printing is needed. Then, the engine unit 3 records an image corresponding to the received toner image data on the recording medium and stores the recording medium on which the image is recorded in the paper re-feeding tray through the reversing unit (NO at Step S20 or Step S31).

Subsequently, the received data accumulating unit 22 resends the accumulated color plane data to the first generating unit 502. Further, the received data accumulating unit 22 resends the accumulated white control plane data to the second generating unit 503 (Step S32). The first generating unit 502 generates the above described chromatic toner image data, and generates the above described object information that is obtained through the language analysis, similarly to Step S16 as described above (Step S33). The first generating unit 502 sends the chromatic toner image data to the generating unit 506 of the second generating unit 503, and sends the object information to the TRC 514 and the halftone engine 515.

The second generating unit 503 generates the above described white toner image data from the white control plane data (Step S34). In this regard, at the above described Step S17, the white toner image data generated by the second generating unit 503 relates to the design pattern effect and the background design effect (the effects realized by attaching the white toner on the front side of the recording medium), but at Step S34, the white toner image data relates to the backing effect (the effect realized by attaching the white toner on the back side of the recording medium).

The TRC 514 receives the object information from the first generating unit 502, and receives the white toner image data from the second generating unit 503. The TRC 514 performs gamma correction, with use of a gamma curve of a 1D-LUT generated through calibration, on the white toner image data generated in accordance with the type of the object indicated by the object information (Step S35). The TRC 514 sends the white toner image data subjected to the gamma correction to the halftone engine 515.

The halftone engine 515 receives the white toner image data subjected to the gamma correction from the TRC 514, and receives the object information from the first generating unit 502. The halftone engine 515 determines parameters (the number of lines, a shape, and an angle) used for halftone processing from the above described halftone processing selection table by using the type of the object indicated by the object information and a type of toner of the toner image data (in this example, the white toner). The halftone engine 515 performs the halftone processing on the toner image data by using the parameter, and sends the toner image data to the engine unit 3 (Step S36). Further, the engine unit 3 records an image corresponding to the received white toner image data on the recording medium, and stores the recording medium in the above described paper ejection unit (Step S37). Incidentally, the white toner image data is converted to a mirror image in the middle of the process in accordance with switch-back of the recording medium.

In contrast, if the print side determining unit 21 determines that only back-side printing is needed (NO at Step S14 and NO at Step S30), the received data accumulating unit 22 sends the accumulated color plane data to the first generating unit 502. Further, the received data accumulating unit 22 sends the accumulated white control plane data to the second generating unit 503 (Step S40). The first generating unit 502 generates the above described chromatic toner image data and generates the above described object information that is obtained through the language analysis, similarly to Step S16 as described above (Step S41). The first generating unit 502 sends the chromatic toner image data to the generating unit 506 of the second generating unit 503 and the TRC 514, and sends the object information to the TRC 514 and the halftone engine 515.

The second generating unit 503 generates the above described white toner image data from the white control plane data, similarly to the above described Step S17 (Step S42). The TRC 514, similarly to the above described Step S18, receives the object information from the first generating unit 502, receives the chromatic toner image data of each of the CMYK colors from the first generating unit 502, and receives the white toner image data from the second generating unit 503. The TRC 514 performs gamma correction, with use of a gamma curve of a 1D-LUT generated through calibration, on the chromatic toner image data and the white toner image data in accordance with the type of the object indicated by the object information (Step S43). The TRC 514 sends the chromatic toner image data of each of the CMYK colors subjected to the gamma correction and the white toner image data subjected to the gamma correction to the halftone engine 515.

The halftone engine 515, similarly to Step S19 as described above, receives the chromatic toner image data of each of the CMYK colors subjected to the gamma correction and the white toner image data subjected to the gamma correction from the TRC 514, and receives the object information from the first generating unit 502. The halftone engine 515 determines parameters (the number of lines, a shape, and an angle) used for halftone processing from the above described halftone processing selection table by using the type of the object indicated by the object information and a type of toner of the toner image data. The halftone engine 515 performs the halftone processing on the toner image data by using the parameters, and sends the toner image data to the engine unit 3 (Step S44). Further, the engine unit 3 records an image corresponding to the received toner image data on the recording medium, and stores the recording medium in the above described paper ejection unit (Step S45). Incidentally, the toner image data is converted to a mirror image in the middle of the process in order to perform back-side recording.

Figure 14:
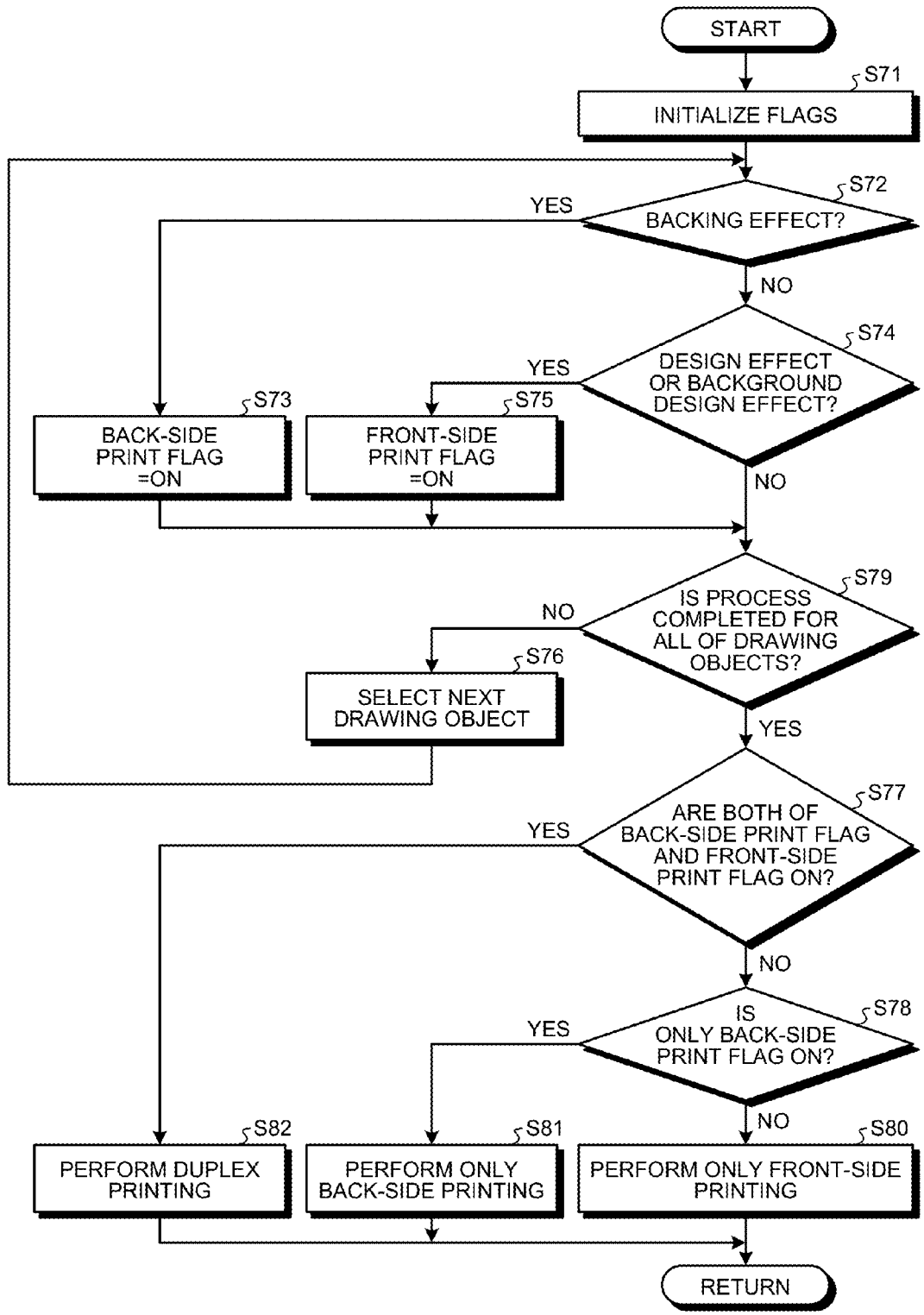
FIG. 14 is a flowchart illustrating an example of operation performed by a print side determining unit.
Figure 15:
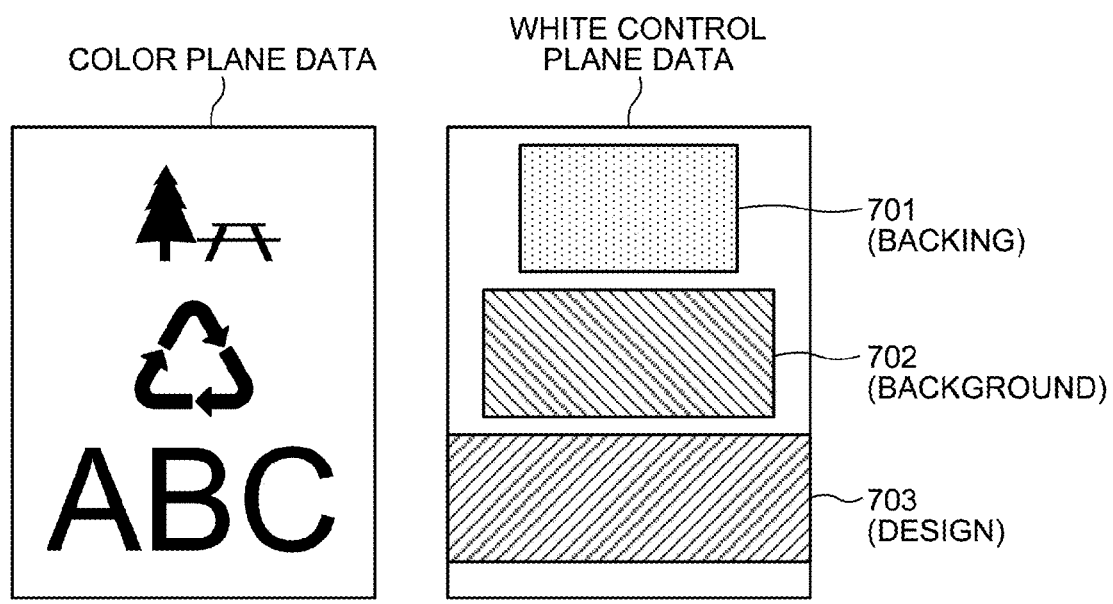
FIG. 15 is a diagram illustrating an example of color plane data and white control plane data to be input.

Next, operation performed by the print side determining unit 21 will be described with reference to FIG. 14. FIG. 14 is a flowchart illustrating an example of the operation performed by the print side determining unit 21. In the following, it is assumed that print data containing the color plane data and the white control plane data as illustrated in FIG. 15 is input. In the example illustrated in FIG. 15, a region denoted by a reference numeral 701 in the white control plane data is a region in which a density value corresponding to the "backing effect" is set, a region denoted by a reference numeral 702 is a region in which a density value corresponding to the "background design effect" is set, and a region denoted by a reference numeral 703 is a region in which a density value corresponding to the "design effect" is set.

As illustrated in FIG. 14, the print side determining unit 21 first performs initialization, and sets both of a back-side print flag indicating that back-side printing is needed and a front-side print flag indicating that front-side printing is needed to OFF (Step S71). Subsequently, the print side determining unit 21 determines whether a white effect corresponding to a density value set for a target object contained in the received white control plane data is the "backing effect" by referring to the white effect selection table 508 (Step S72).

At the above-described Step S72, if the white effect corresponding to the density value set for the target object is the "backing effect" (YES at Step S72), the print side determining unit 21 sets the back-side print flag to ON (Step S73). Incidentally, for example, the print side determining unit 21 may ask the engine unit 3 for example for a type of a recording medium to be actually used, and if the recording medium to be actually used is not transparent, may set the front-side print flag to ON. In contrast, if the recording medium to be actually used is transparent, only the back-side print flag is set to ON.

At the above-described Step S72, if the white effect corresponding to the density value set for the target object is not the "backing effect" (NO at Step S72), the print side determining unit 21 determines whether the white effect corresponding to the density value set for the target object is the "design effect" or the "background design effect" (Step S74), and in the case of the "design effect" or the "background design effect" (YES at Step S74), sets the front-side print flag to ON (Step S75).

Subsequently, the print side determining unit 21 determines whether the processes from Steps S72 to S75 are completed for all of drawing objects contained in the white control plane data (Step S79). If the processes from Steps S72 to S75 are not completed for all of the drawing objects (NO at Step S79), a next drawing object is selected (Step S76), and the processes from the above described Step S72 are repeated.

If the processes from Steps S72 to S75 are completed for all of the drawing objects (YES at Step S79), it is determined whether both of the back-side print flag and the front-side print flag are ON (Step S77). If both of the flags are ON (YES at Step S77), it is determined that duplex printing is needed (back-side printing is also needed) (Step S82). If both of the flags are not ON (NO at Step S77), it is determined whether only the back-side print flag is ON (Step S78). If only the back-side print flag is ON (YES at Step S78), it is determined that only back-side printing is needed (Step S81), and if only the front-side print flag is ON (NO at Step S78), it is determined that only front-side printing is needed (Step S80).

As described above, in the embodiment, image recording operation for realizing a white effect specified by the white control plane data is determined on the basis of the white control plane data that is image data for specifying a type of the white effect indicating a visual or tactile effect to be applied to the recording medium by using the white toner. More specifically, image recording operation for realizing a white effect specified by the received white control plane data is determined on the basis of the white effect selection table, in which a density value set in the white control plane data, a type of a white effect, and a mode indicating a method of attaching the white toner to realize the white effect are associated with one another. Therefore, it is possible to use the white color material in various ways.

Incidentally, as a matter of course, an object of the present invention can be realized by providing a system or an apparatus with a storage medium (or a recording medium) that stores therein a software program code for implementing the above described functions of the embodiment, and by causing a computer (a CPU or an MPU) of the system or the apparatus to read and execute the program code stored in the storage medium. In this case, the program code read from the storage medium implements the above described functions of the embodiment, and the storage medium that stores therein the program code is a component of the present invention.

Further, as a matter of course, it is possible to implement the above described functions of the embodiment not only by causing the computer to execute the read program code, but also by causing an operating system (OS) or the like that runs on the computer by instructions of the program code to perform a part or all of actual processes.

Further, as a matter of course, it is possible to write the program code read from the storage medium to a function extension card inserted in the computer or to a memory provided in a function extension unit connected to the computer, and cause a CPU provided in the function extension card or the function extension unit to perform a part or all of actual processes to implement the above described functions of the embodiment. Further, if the present invention is applied to the above described storage medium, the storage medium stores therein program codes corresponding to the above described flowcharts.

According to an embodiment of the present invention, it is possible to use a white color material in various ways.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a data receiving unit to receive color plane data as chromatic image data, and receive white control plane data as image data for specifying a type of a white effect indicating a visual or tactile effect to be applied to a recording medium by using a white color material;
   a determining unit to determine image recording operation for realizing the white effect specified by the white control plane data, on the basis of the white control plane data;
   a first generating unit to generate chromatic color material image data indicating a recording amount of a chromatic color material on the basis of the color plane data;
   a second generating unit to generate white color material image data indicating a recording amount of a white color material on the basis of the white control plane data; and
   a control unit to control recording of images corresponding to the chromatic color material image data and the white color material image data on one side or both sides of the recording medium in accordance with the image recording operation determined by the determining unit,
   wherein the image recording operation for realizing the white effect specified by the received white color plane data is determined by the determining unit on the basis of white effect selection information in which (i) a density value set in the white control plane data, (ii) a type of the white effect, and (iii) a mode indicating a method of attaching the white color material to realize the white effect are associated with one another.

2. The image processing apparatus according to claim 1, wherein the determining unit determines the image recording operation for realizing the white effect specified by the received white color plane data, on the basis of the white effect selection information and a type of the recording medium used for the image recording operation.

3. The image processing apparatus according to claim 1, wherein the second generating unit generates the white color material image data from the white control plane data by referring to the white effect selection information.

4. The image processing apparatus according to claim 1, further comprising:
   an accumulating unit to accumulate the received color plane data and the received white control plane data; and
   an image recording unit to record an image on the recording medium on the basis of the chromatic color material image data and the white color material image data,
   wherein
   the control unit controls the accumulating unit, the first generating unit, the second generating unit, and the image recording unit in accordance with the image recording operation determined by the determining unit.

5. An image processing method comprising:
   (a) receiving color plane data as chromatic image data;
   (b) receiving white control plane data as image data for specifying a type of a white effect indicating a visual or tactile effect to be applied to a recording medium by using a white color material;
   (c) determining image recording operation for realizing the white effect specified by the white control plane data, on the basis of the white control plane data;
   (d) generating chromatic color material image data indicating a recording amount of a chromatic color material on the basis of the color plane data;

(e) generating white color material image data indicating a recording amount of a white color material on the basis of the white control plane data; and (f) controlling recording of images corresponding to the chromatic color material image data and the white color material image data on one side or both sides of the recording medium in accordance with the image recording operation determined at the determining, wherein the image recording operation for realizing the white effect specified by the received white color plane data is determined in (c) on the basis of white effect selection information in which (i) a density value set in the white control plane data, (ii) a type of the white effect, and (iii) a mode indicating a method of attaching the white color material to realize the white effect are associated with one another.

6. A computer program product comprising a non-transitory computer-readable medium including programmed instructions, the instructions causing a computer to execute at least the image processing method according to claim 5.

* * * * *